US012588652B2

(12) United States Patent (10) Patent No.: US 12,588,652 B2
Vaccari (45) Date of Patent: Mar. 31, 2026

(54) PET'S CAGE

(71) Applicant: FERPLAST S.p.A., Castelgomberto (IT)

(72) Inventor: Nicola Vaccari, Castelgomberto (IT)

(73) Assignee: FERPLAST S.p.A., Castelgomberto (IT)

( * ) Notice: Subject to any disclaimer, the term of this patent is extended or adjusted under 35 U.S.C. 154(b) by 0 days.

(21) Appl. No.: 18/557,278

(22) PCT Filed: Feb. 17, 2022

(86) PCT No.: PCT/IB2022/051407
§ 371 (c)(1),
(2) Date: Oct. 25, 2023

(87) PCT Pub. No.: WO2022/229715
PCT Pub. Date: Nov. 3, 2022

(65) Prior Publication Data
US 2024/0373815 A1 Nov. 14, 2024

(30) Foreign Application Priority Data
Apr. 29, 2021 (IT) ........................ 102021000010928

(51) Int. Cl.
*A01K 1/03* (2006.01)
(52) U.S. Cl.
CPC .................................... *A01K 1/032* (2013.01)
(58) Field of Classification Search
CPC .................................. A01K 1/032; A01K 1/03
(Continued)

(56) References Cited

U.S. PATENT DOCUMENTS 2,579,797 A * 12/1951 Churchfield ........... A01K 1/035
119/28.5
4,570,574 A * 2/1986 Burkholder ............ A01K 31/02
119/481
(Continued)

FOREIGN PATENT DOCUMENTS

CN 112335570 A * 2/2021 ............. A63G 21/02
FR 2199934 A1 4/1974
(Continued)

OTHER PUBLICATIONS

CN-112335570-A_MACHINE_TRANSLATION (Year: 2021).*
(Continued)

*Primary Examiner* — David J Parsley
*Assistant Examiner* — Sahar Almatrahi
(74) *Attorney, Agent, or Firm* — Seyfarth Shaw LLP

(57) ABSTRACT

A cage designed to contain an animal is formed by the reciprocal conjunction of a series of grilled walls in a substantially parallelepiped arrangement applied to a basin type base. The cage includes a window opening on a grilled wall. The cage also include a ladder-like closing element having a substantially quadrilateral conformation and having dimensions corresponding to those of the window opening in which it is insertable to be closed. The ladder-like closing element is removable from the window opening to assume a configuration of a ramp positionable between an edge by the opening of the cage and an inner surface thereof and/or an outer surface adjacent thereto.

11 Claims, 5 Drawing Sheets

Figures 1, 1A, 2, 2A:
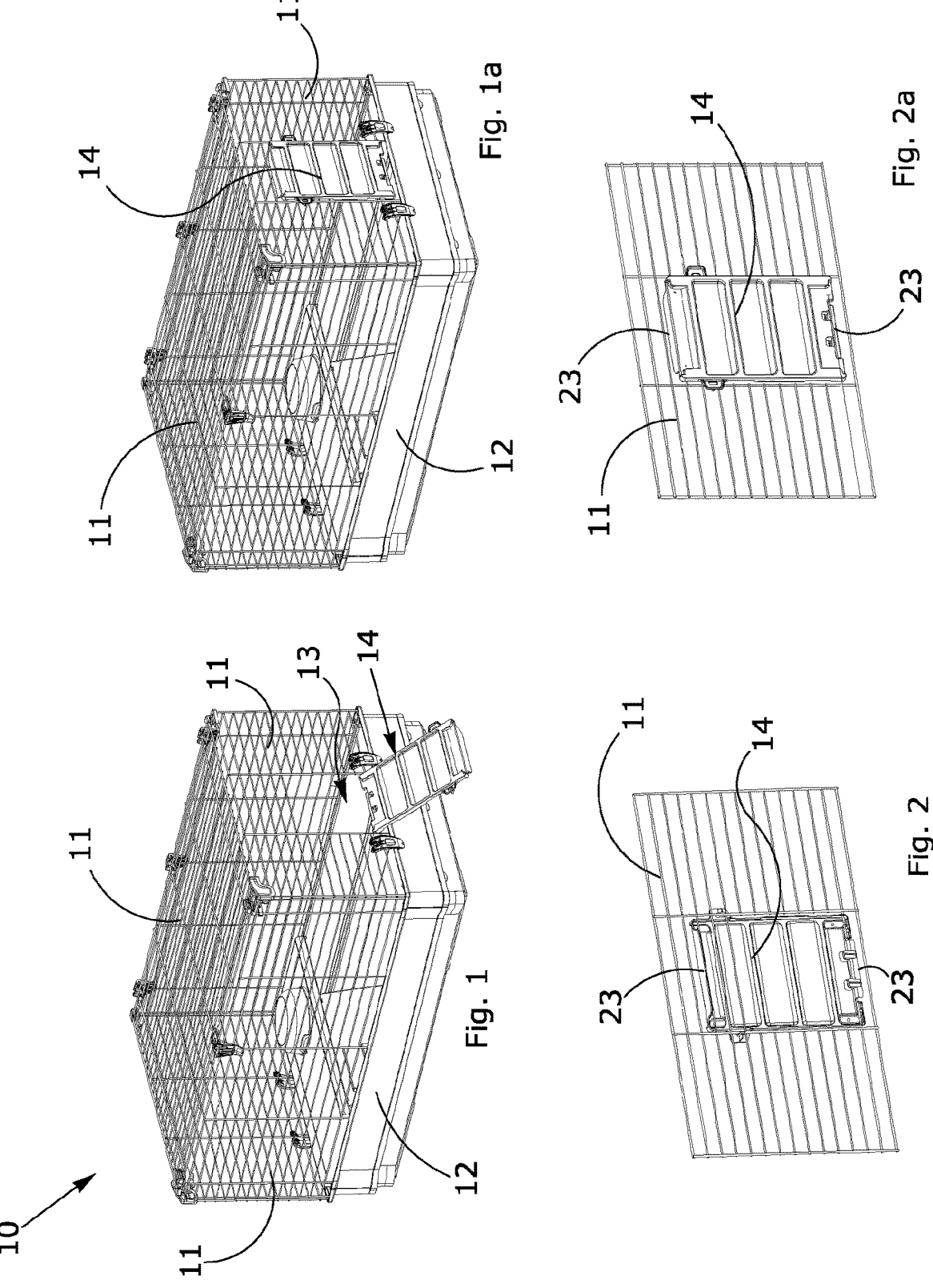

(58) Field of Classification Search
USPC ........................................................ 119/482
See application file for complete search history.

(56) References Cited

U.S. PATENT DOCUMENTS

| 6,484,344 | B1 * | 11/2002 | Cooper ................. A61G 3/061 |
| | | | 14/71.1 |
| 10,856,519 | B2 * | 12/2020 | Volin ................... A01K 1/0272 |
| 2014/0116347 | A1 | 5/2014 | Casto et al. |
| 2019/0037799 | A1 * | 2/2019 | Murray ............... A01K 1/0272 |
| 2020/0281156 | A1 * | 9/2020 | Liu .......................... A01K 1/03 |
| 2022/0240482 | A1 * | 8/2022 | Yang ..................... A01K 31/06 |

FOREIGN PATENT DOCUMENTS

| GB | 1359959 A | 7/1974 |
| WO | 9911117 A1 | 3/1999 |

OTHER PUBLICATIONS

International Search Report for PCT/IB2022/051407, dated May 20, 2022.
Written Opinion for PCT/IB2022/051407, dated May 20, 2022.

* cited by examiner

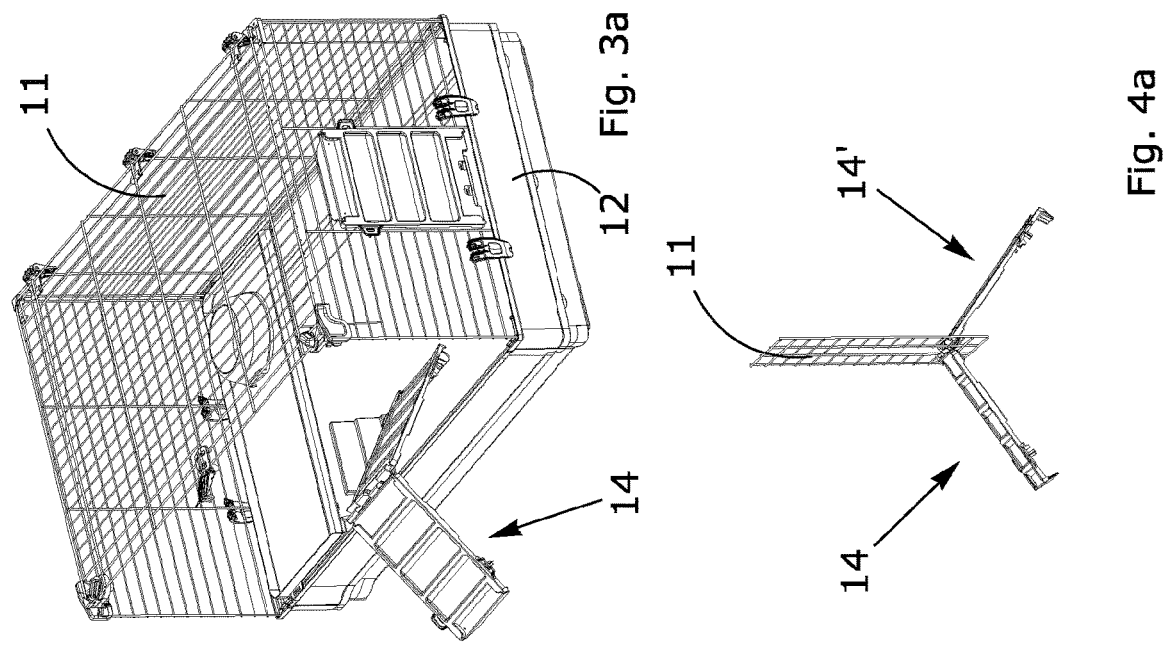
Fig. 3a
Fig. 4a
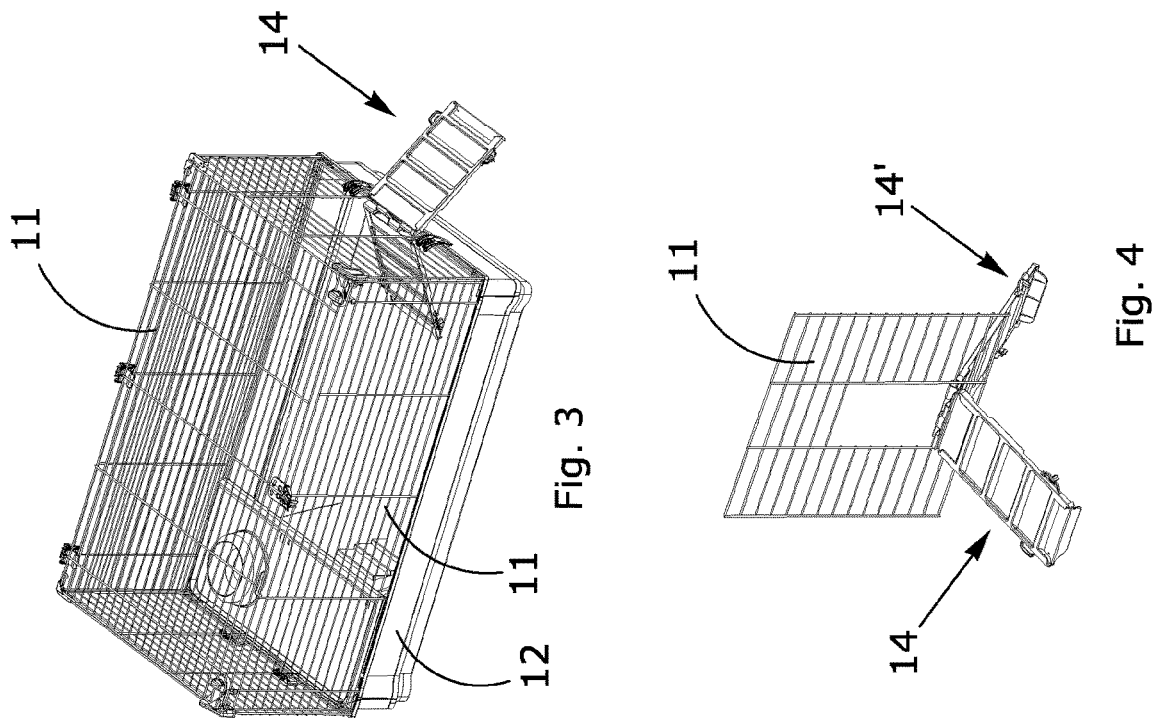
Fig. 3
Fig. 4

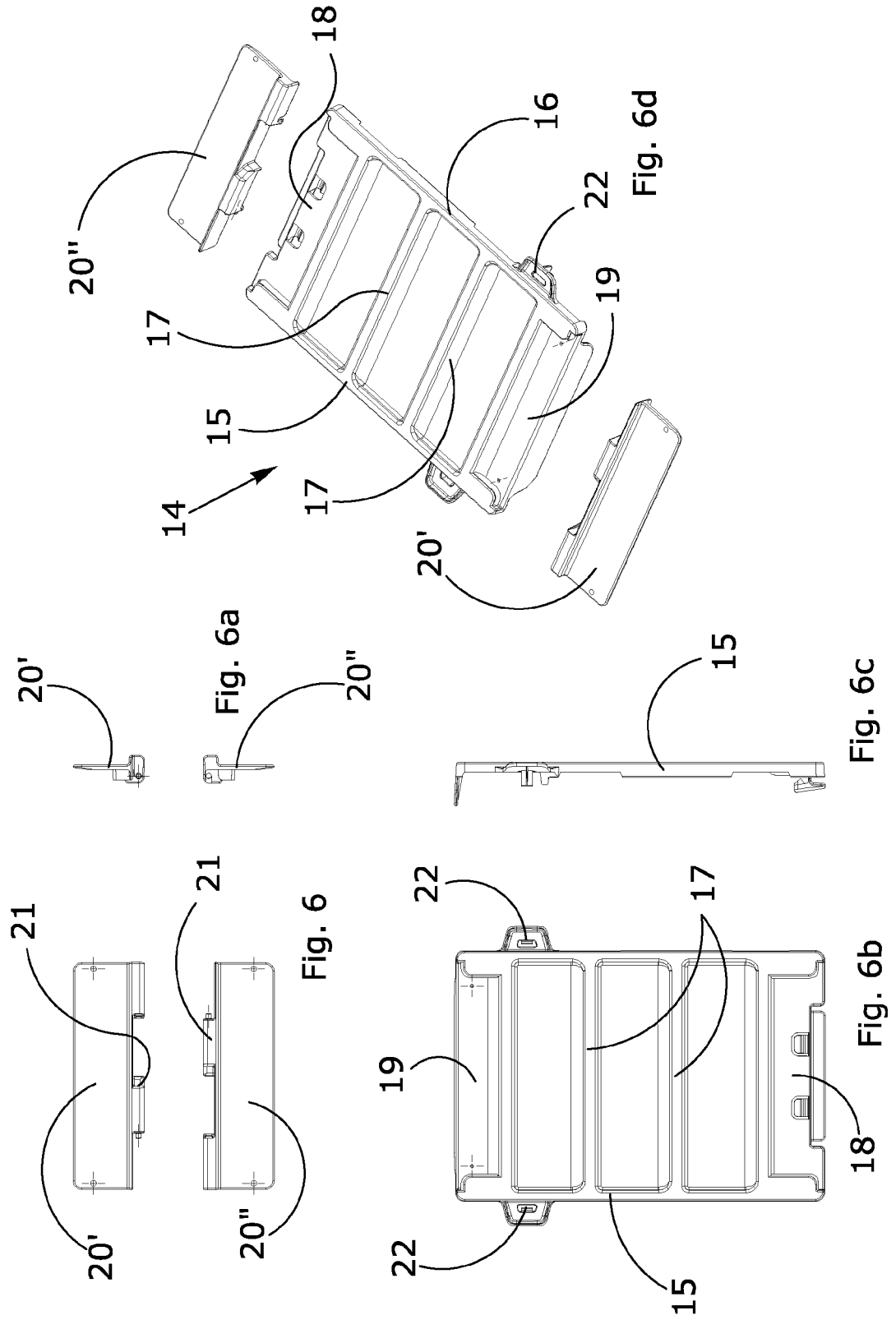

PET'S CAGE

FIELD OF APPLICATION

The present invention relates to a cage for pets, in particular rodents, provided with elements for opening and closing access windows and which also act as a means for the autonomous transfer of animals between different environments.

More in particular, it is envisaged that said elements for opening and closing access windows and which also act as a means for the autonomous transfer of animals, comprise at least one ladder which allows the transfer of the contained animals and can be integrated as a closing element of the access window of the cage itself, thus performing a dual function, i.e., as an independent transfer element of the animals and also as a closing element of the access window.

Such an accessory for cages is preferably made of plastic material according to a conformation such as to allow it to be hooked to the access window on the net of the cage, thus perfectly compatible with the conformation of the opening, and also be used as a ladder for the animal, being able to assume the arrangement of a single or even double ramp.

The present invention is advantageously applied in the field of accessories for pets, and in more detail in the field of cages for animals in particular rodents, such as rabbits, guinea pigs or the like.

PRIOR ART

The use of different types of pet's cages is known, and also those designed to contain rodents such as rabbits and guinea pigs or hamsters in particular.

Generally, the pet's cages of this type also consist of the combination of a plurality of grilled walls which together assume a three-dimensional parallelepiped arrangement, applicable on a basin type base in which a layer of inert material adapted to absorb excrement and to confer comfort is poured, to make the environment desirable for the animal contained therein.

The cages used to contain rodents such as rabbits, guinea pigs or the like, unlike other animal cages, must envisage the possibility of allowing the animal to exit outside the cage so as to be able to reach a wider and more varied living environment, for example to allow the animal to reach a corner of a garden so as to be able to graze the grass.

For this purpose, special fences are commonly present on the market, which are positionable for example on a lawn, inside which the cage is arranged comprising a means that allow the animal to exit therefrom to have access to the external grassy area.

In fact, as mentioned, all the cages designed to contain pets comprise a basin type base generally having a height from the ground even of 15-20 cm and, in the case of specific cages for rodents such as rabbits, guinea pigs or the like, an inlet/outlet opening must be obtained on the wall of the net cage above the edge of the basin.

Considering also that normally rabbits, or guinea pigs, are not able to easily jump or overcome obstacles in general, if such an opening is to be used to have the animal exit the cage, a means is necessary which are adapted to overcome the lower edge of the cage access window.

For this reason, the use of universal components of the ramp or ladder type or the like is also envisaged, which from one point of view can be difficult to apply with respect to the edge of the obstacle to be overcome since they are generally not compatible with the shape of the edge on which they are placed, and also, when these components are not used, they must be placed in random and temporary locations with the risk of being lost.

Furthermore, such temporary components must be purchased separately from the cage so that, in addition to their management difficulties, there is also a consequent increase in product costs.

In addition, the retailer of accessories for pets must be able to stock different accessories such as access and exit ramps suitable for individual different needs, with the consequent warehouse management difficulty and the increase of spaces, including display spaces, often extremely small.

Document FR 2199934 A discloses a cage for pets of rodent type like rabbits, guinea pigs or the like, formed by the reciprocal conjunction of a series of grilled walls in a substantially parallelepiped arrangement applied to a basin type base, said cage being provided with a window opening obtained on at least one of the grilled walls of the cage, comprising at least one ladder-like closing element having a shape and dimensions corresponding to those of the window opening in which it is insertable to be closed, the ladder-like closing element being removable from said window opening to assume a configuration of a ramp that may be placed between the edge by the opening of the cage and the inner surface thereof and/or the outer surface adjacent thereto.

Document GB 1359959 A discloses a cage for small animals comprising a tray like base formed integrally with the walls so as to provide hinge portions that allow the walls to rotate during assembly. The two opposite walls retain the ends of a U-shaped perforated grille, which constitutes the top and the other two walls of the cage. The walls are held in place by a spring-loaded handle which passes over them. A door is included in one wall, hinged to its lower end. A slot is provided in a wall of the tray like base for slidingly receiving an under-tray which is easily removable for cleaning purposes.

Document US 2014/0116347 A1 discloses a cage coupled to a base element to provide a fence for one or more animals to be kept in captivity. The base element includes a sliding tray configured to move from a closed position to an open position to allow cleaning the base element. When in the closed position, a portion of the tray forms a floor portion of the base element. When the tray moves from the closed position to the open position, the tray translates in a direction away from the base element, thereby exposing an opening defined in the floor of the base element.

DESCRIPTION OF THE INVENTION

The present invention aims to provide an accessory for pet's cages, in particular rodents such as rabbits, guinea pigs or the like, consisting of an element that can be integrated with the access window of the cage, which can be withdrawn therefrom to also act as a means for transferring animals from the inside to the outside of the cage and vice versa, thus obtaining a condition capable of eliminating or at least reducing the drawbacks highlighted above with the traditional cages of the same type.

The invention aims in particular to produce a cage provided with a new type of cover for opening/closing the access window, giving it the function of a single or double ramp for the exit and entry of the animal.

This is obtained by means of a pet's cage, in particular rodents, provided with elements for opening and closing access windows and which also act as a means for transferring the contained animals between different environments, the features of which are described in the main claim.

The dependent claims of the present solution outline advantageous embodiments of the invention.

The main advantages of this solution ultimately relate to the modularity and integration of an accessory that makes a cage for rabbits, guinea pigs or the like extremely easy to use in cases where it is designed to let the animal independently exit to spaces outside the cage.

Another object of the invention is to limit the difficulties of warehouse management for the retailer, as a new single cage model is proposed provided with an integrated modular accessory and having a dual function of closing the access window and a ramp for the autonomous exit of the animal.

ILLUSTRATION OF THE DRAWINGS

Figures 5, 5A, 5B, 5C, 5D:
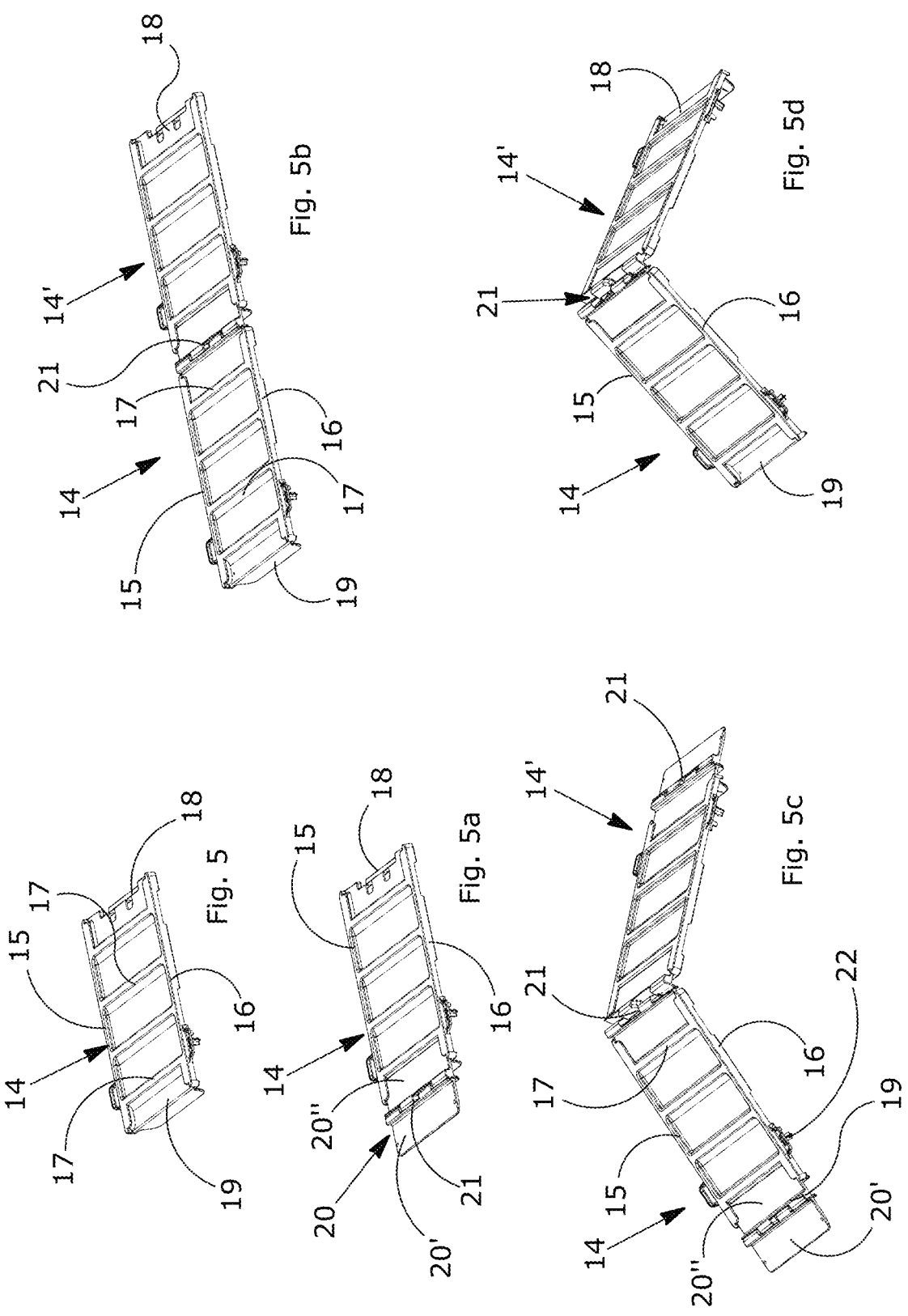
Figures 7, 7A, 7B, 7C:
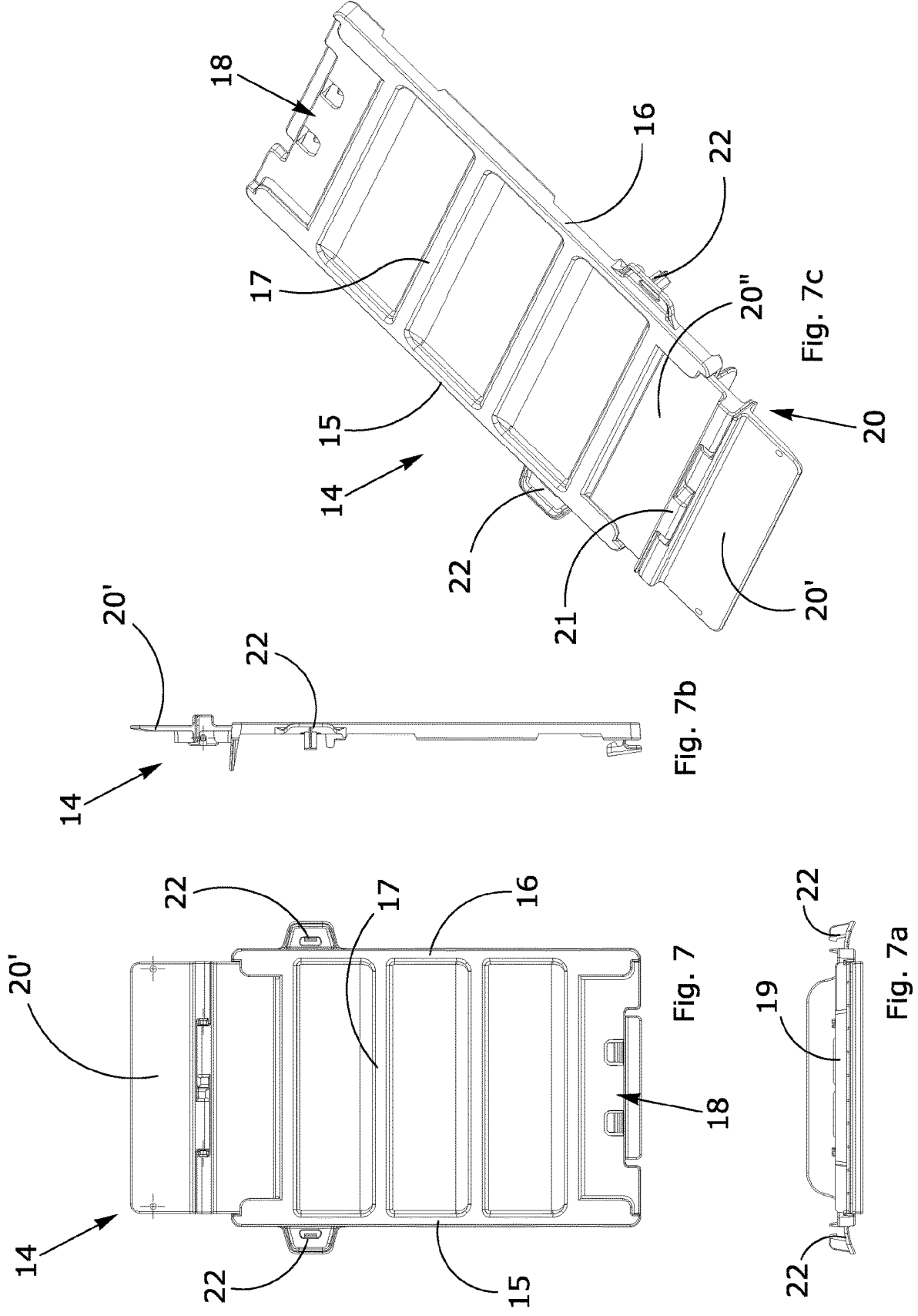

Other features and advantages of the invention will become apparent from reading the following description of an embodiment of the invention provided by way of non-limiting example, with the aid of the figures illustrated in the appended tables of drawings, in which:

FIGS. 1 and 1*a* depict schematic and axonometric perspective views of a cage for rodents such as rabbits, guinea pigs or the like provided with an access window involved in the multifunction closing element and ramp according to the invention;

FIGS. 2 and 2*a* illustrate detailed schematic views respectively from the inside and outside of the cage of the multifunction closing and ramp element;

FIGS. 3 and 3*a* show schematic and perspective views of the window closing element placed in dual ramp use mode in the first case with respect to the window and in the second with respect to an opening of an entire wall;

FIGS. 4 and 4*a* are detailed views of a double ramp ladder positioned on the edge of the window of a grilled wall;

FIGS. 5 to 5*d* depict schematic and perspective views of as many examples of configuration of the closing element/single or double access ramp according to the invention;

FIGS. 6 to 6*d* illustrate schematic and perspective views of further configuration examples and details of the closing element/single or double access ramp according to the invention with exploded extension elements;

FIGS. 7 to 7*c* refer to further closing/ramp versions with extension elements installed.

DESCRIPTION OF AN EMBODIMENT OF THE INVENTION

Referring to the appended figures, 10 generally indicates a cage designed to contain pets, in this case a cage for rodents such as rabbits, guinea pigs or the like, formed by the reciprocal conjunction of a series of grilled walls 11 forming a substantially parallelepiped arrangement applied to a basin type base 12.

According to the embodiment shown in FIG. 1, the cage 10 is provided with a window opening indicated with 13 that is obtained on one of the grilled walls 11 of the cage and whose lower edge is placed slightly above the edge of the basin type base 12.

According to an embodiment depicting the main feature of the invention, the above-described cage is affected by the presence of a ladder-like closing element 14 having a substantially quadrilateral conformation and having dimensions corresponding to those of the window opening 13.

In fact, the closing element 14 is configured to perform a first function, which is to close on the window opening 13.

For this purpose, the closing element 14, as shown in FIGS. 5, 6 and 7, has a substantially ladder-like conformation formed by two uprights 15 and 16 joined by a series of crosspieces 17.

Furthermore, the closing element 14 has two end edges 18 and 19 configured as a recess, or comprising a seat bounded by two tracks into which a joining element 20 is insertable.

More in particular, according to the e embodiment depicted in FIGS. 5*a*, 5*c* and 6 to 6*d*, such a joining element 20 comprises a pair of rectangular plates 20' and 20" joined by a connecting joint 21 with staggered protruding portions.

The joining element 20 can be used both for the swivel joining of two ladder-like closing elements 14 and 14', which can be used for example to form a bridge in cases where it is necessary to connect the inner part to the outer part of the cage allowing the exit and entry of the animal, as shown in FIGS. 3, 4, 5*c* and 5*d*, or from a support plane or walkway applicable to one of the inner or outer walls of the cage.

Furthermore, the joining element 20 can be used as an extendable portion of the ladder in the case of particularly high bottoms.

In this case, one of the two swivel portions of the joining element 20 is inserted into the recess bounded by the said two tracks of the two ends 18 and 19 of the closing element 14, as shown in FIGS. 5*c* and 7*c*.

Furthermore, according to an advantageous embodiment of the invention depicted in FIGS. 5, 6 and 7, the ladder-like closing element 14 has flexible teeth 22 placed at the lateral profiles 15 and 16 used to hook the ladder-like element to the vertical rods placed on the sides of the window 13 of the net of the cage 10, while on each of the horizontal adjacent sides there is a groove defined by a tab 23 depicted in FIGS. 2 and 2*a*, which allows to engage a respective horizontal rod of the window open on the wall 11 and prevent the animal from opening it by pushing from the inside.

As mentioned above, the purpose of the invention is to integrate the closing function of the element 14 with the function of ladder or exit/access ramp of the animal, i.e., to create a single element, preferably in plastic material which can be hooked to the window opening 13 present on one of the walls of the cage, which can be used as a single or double ramp ladder for the animal.

Such a component 14, being made of plastic material, can be configured according to a conformation, possibly modifiable according to the needs or practicality of use, which facilitates the ascent and descent of the animal wanting to leave the cage, overcoming the obstacle of the lower edge of the window placed at the edges of the basin type base 12, to reach a possibly grassy or similar external area and if necessary return to the cage.

This is allowed on the one hand by the presence of the teeth and the coupling profiles 22 to the window 13, and on the other by the conformation of the ladder which acts as a single or double ramp and by the presence and shape of any appropriate steps integrated on the surface of the piece, or through a correct length and width of the ladder itself.

As depicted in FIGS. 3 and 3*a*, the ladder-like closing element 14 is arranged with a double ramp at the edge of the window and in the second case on the edge of the basin type base 12, depending on the needs and the structural and modular capacities of the cage.

The invention has been described in the foregoing with reference to a preferential embodiment thereof. However, it is envisaged that the invention is susceptible to some variants which fall within the scope thereof, and which are technically equivalent.

The invention claimed is:

1. A cage for an animal,
the cage being:
    formed by the reciprocal conjunction of a series of grilled walls in a substantially parallelepiped arrangement applied to a basin type base, and
    provided with a window opening obtained on at least one of the grilled walls of the cage,
the cage comprising a rung-frame closing element having a first shape and first dimensions corresponding to a second shape and second dimensions of the window opening in which the rung-frame closing element is insertable to be closed, the rung-frame closing element comprising two uprights joined by a series of crosspieces, the rung-frame closing element being removable from the window opening for use as a ramp extending from an edge adjacent to the window opening, each upright of the two uprights of the rung-frame ladder like closing element having a respective sidewall extending from a first crosspiece of the series of crosspieces to a first distal end of the rung-frame closing element,
    the respective sidewalls and a final crosspiece of the series of crosspieces defining a u-shaped female coupling interface that is open at the first distal end, the u-shaped female coupling interface receiving a joining element, the final crosspiece being a nearest crosspiece, of the series of crosspieces, to the first distal end.

2. The cage of claim 1, wherein the joining element comprises a pair of plates joined by a connecting joint.

3. The cage of claim 1, wherein the joining element realizes a swivel joining respective uprights of two rung-frame closing elements.

4. The cage of claim 2, wherein one plate of the pair of plates is insertable into the u-shaped female coupling interface.

5. The cage of claim 2, wherein:
    each upright comprises a flexible tooth, and
    each flexible tooth engages a respective vertical rod placed on the edge of the window opening of the cage.

6. The cage of claim 1, wherein:
    each horizontal adjacent side of the rung-frame closing element comprises a groove that is defined by a tab; and
    each tab engages a respective horizontal rod of the window opening.

7. The cage of claim 1, wherein the animal is a rodent.

8. The cage of claim 1, wherein the animal is a rabbit or a guinea pig.

9. The cage of claim 1, wherein a respective hollow space is defined between each pair of adjacent crosspieces of the series of crosspieces.

10. The cage of claim 1, wherein the first crosspiece is a nearest crosspiece of the series of crosspieces to a second distal end of the rung-frame closing element that is opposite to the first distal end.

11. The cage of claim 1, wherein the u-shaped female coupling interface is a continuous u-shaped female coupling interface.

* * * * *